March 14, 1933. E. A. SHANK 1,901,475
FOLDING TIRE DISPLAY HOLDER
Filed May 1, 1931
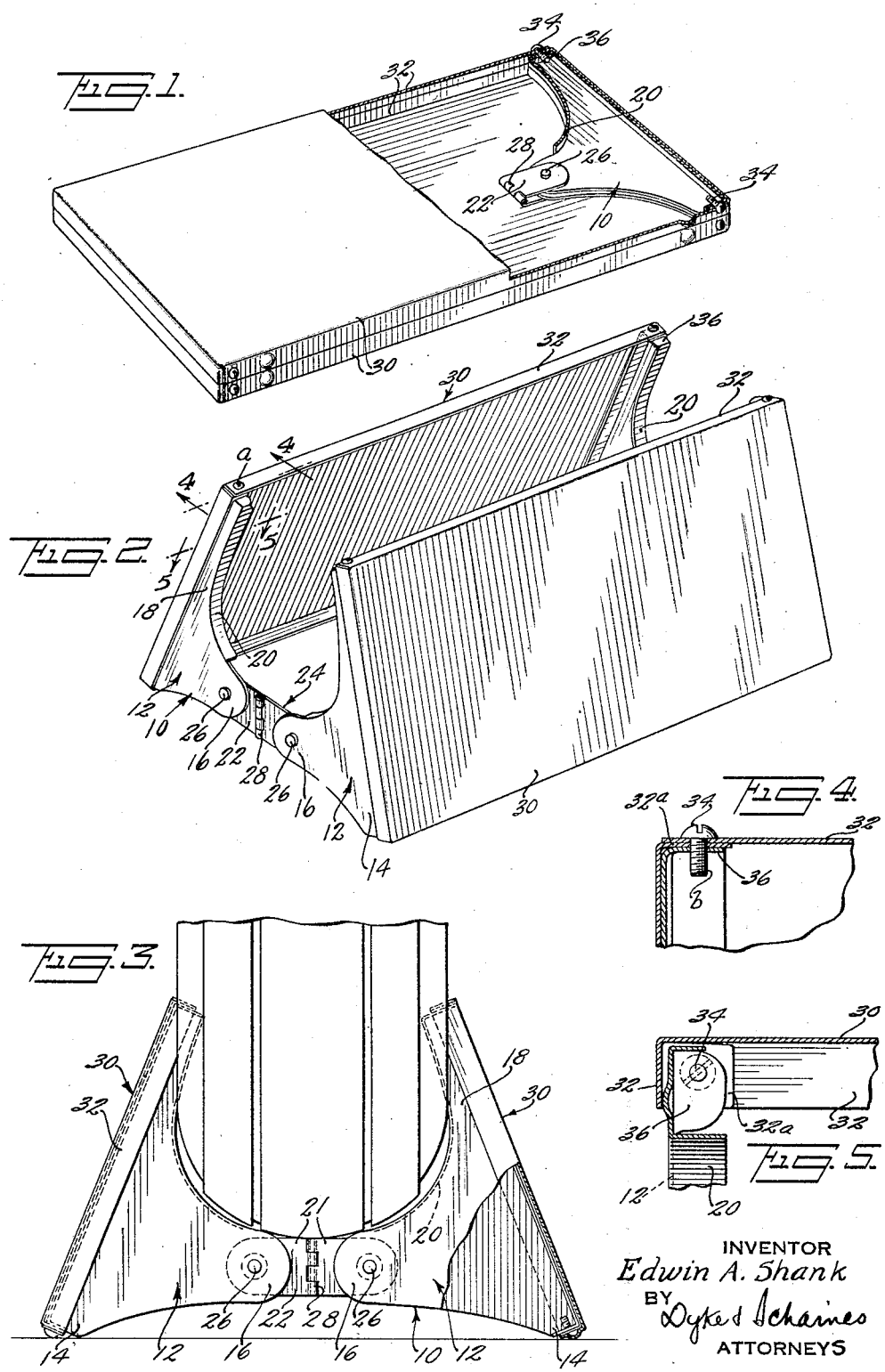
INVENTOR
Edwin A. Shank
BY
Dyke & Schaines
ATTORNEYS Patented Mar. 14, 1933

1,901,475

UNITED STATES PATENT OFFICE

EDWIN A. SHANK, OF NEW ROCHELLE, NEW YORK

FOLDING TIRE DISPLAY HOLDER

Application filed May 1, 1931. Serial No. 534,263.

The principal object of my invention is to provide an improved tire support of the general type disclosed in my Patent No. 1,539,519 issued May 26, 1925, and which is adapted to carry display advertising matter on both sides, to be readily folded into substantially minimum space, and has ample strength and stability for holding the heavier and bulkier tires as well as smaller tires.

In my drawing illustrating a preferred embodiment of the invention Figure 1 is a perspective view with parts broken away of a sheet metal tire holding device embodying my invention as folded for shipping, storage, etc.

Fig. 2 is a perspective view of the holder in position to receive a tire.

Fig. 3 is an end view with parts broken away of the tire holder with a tire in place therein.

Figs. 4 and 5 are detail sectional views taken on the lines 4—4 and 5—5 respectively of Fig. 2.

Two tire supporting clamps 10 are provided arranged in spaced relation to receive and support the tire. Each tire clamp 10 is made up of two half-clamps 12. The half-clamps 12 comprise a foot portion 14 and pivot ears 16 and a substantially quadrant tire engaging portion 18, the latter being provided with a substantially quadrant flange 20 to engage and support the tire without cutting. All parts are preferably made of sheet metal.

The half-clamps 12 of each clamp 10 are connected through their intermediate or pivot ear parts 16 by a substantially universal pivotal connection. This may conviently be accomplished by pivotally attaching the leaves 22 of an ordinary hinge 24 to each of the pivot ears 16 as at 26 or one of the hinge leaves 22 may be rigidly connected to the pivot ear 16 of one half-clamp 12 and pivotally connected to the other half-clamp 12 of each clamp 10, or other universal connections may be resorted to if desired.

The pivotal relation at 26 of the half-clamps 12 serves as in the device of my Patent 1,539,519 to make the clamps self-adjusting for different sizes of tires and for enabling the clamping of the tires to be assisted by the weight of the tire itself. The pintle hinge joint at 28 serves to permit the half-clamps 12 to be folded with their normally outer faces flat against one another when not in use for supporting a tire as indicated in the broken away portion of Fig. 1.

I interconnect the pair of clamps 10, 10 by suitable longitudinal members 30, 30 which may be of various skeleton or other formations, but preferably comprise rectangular sheet metal panels provided around their edges with inwardly directed flanges 32, so that when brought together with these flanges meeting, as indicated in Fig. 1, they make up practically a thin flat box.

To the opposite ends of these longitudinal members 30 I attach the clamp 10 by a pivotal attaching means, preferably by means of stove-bolts 34 screwed through the top and bottom flanges 32 and through ears 32a of the end flanges of members 30 and through ears 36 of the half-clamp members 12. Nuts for the stove-bolts 34 can be dispensed with by using slightly smaller holes in the panel flanges 32 than in the half-clamps 12 and screwing stove bolts 34 tightly in place in the panel flanges.

The pivotal connections obtained as described permit each half-clamp 12 to fold inwardly at each corner of the device (when viewed from above with the parts in extended relation) but the end flanges 32 of members 30 prevent the outward turning of the half-clamps 12 beyond substantially a right angle to the respective longitudinal member 30.

It will be seen that the hinged half-clamps 12 can be folded inwardly with their normally outer faces flat against one another as the front and back panels 30, 30 are brought directly toward one another, and that these half-clamps are brought into place within the enclosure provided between panel flanges; that the folded length of the complete device is just the length of the panels; that when extended the clamps are held from spreading outwardly away from one another by flanges 32 so that the presence of hinge 24 does not detract from the secureness with which the tire is clamped, held and supported, and the device is strong and rugged and can be simply and easily made, packaged and used and affords a maximum of advertising space, and that the device may be disposed with either of the display panels 30 in front or behind at choice.

I claim:

1. In a folding tire support two tire clamps each comprising half-clamps pivotally connected to clamp a tire by its weight, said half-clamps also pivotally connected to fold with their outer faces toward one another, and clamp connecting means to which the clamps are pivotally attached.

2. Device as claimed in claim 1, in which the pivotal turning of the half-clamps with respect to the connecting means is limited to approximately 90 degrees.

3. Device as claimed in claim 1, in which the clamp connecting means consist of two sheet metal panels with inwardly directed flange portions.

4. Device as in claim 1, in which the clamp connecting means consist of two flanged sheet metal panels, and pivotal turning of half-clamps with respect thereto is limited to approximately 90 degrees.

5. In a folding tire support two tire clamps each comprising two half-clamps and a connecting hinge having a pivotal hinge leaf relation to at least one of said half-clamps, and a pair of flanged sheet metal panels, to the ends whereof said half-clamps are pivotally connected.

6. Device as in claim 5, in which the pivotal turning of the half-clamps with respect to the panels is confined to approximately 90 degrees.

7. A folding display tire holder comprising two pairs of half tire holders with one of the halves of each pair substantially universally turnable with respect to the other half, and clamp connecting means to which the halves are pivotally attached, whereby the device can support and clamp a tire by its weight and also can be folded without relative endwise displacement of the connecting means with respect to one another and with the half clamp members collapsed inwardly therebetween.

In testimony whereof, I have signed my name hereto.

EDWIN A. SHANK.